UNITED STATES PATENT OFFICE.

PITER VERVAET, OF PATERSON, NEW JERSEY.

PROCESS OF MANUFACTURING WELDING COMPOUNDS.

SPECIFICATION forming part of Letters Patent No. 720,300, dated February 10, 1903.

Application filed July 16, 1902. Serial No. 115,750. (No specimens.)

*To all whom it may concern:*

Be it known that I, PITER VERVAET, a subject of the King of Belgium, residing in Paterson, in the county of Passaic and State of New Jersey, have invented certain new and useful Improvements in Processes of Manufacturing Welding Compounds; and I do hereby declare the following to be a full, clear, and exact description of the invention, such as will enable others skilled in the art to which it appertains to make and use the same.

This invention relates to welding compounds; and it has for its object and consists in a method of manufacturing a welding compound in which borax and glass are employed as the ingredients in such manner that they will be so associated as to produce the best results. These ingredients are preferably used in the proportion of three to one—three pounds of borax to one of glass, say. At the outset they are in a more or less reduced or substantially powdered state, and in this condition are placed, according to the preferred manner of following my method, in a crucible together and then heated to a degree of temperature which, being above that of the melting-point of the glass, is sufficient to reduce both to the molten condition; but the glass and borax may be heated each to the melting-point separately and then brought together in the molten state, if desired, though I find that the first-described way is best. The object and effect of heating the borax and glass together, or rather of bringing them together while each is in the molten condition, is to secure their most intimate and uniform mixing, and after they have reached this molten condition (and if they are melted separately have been brought together) the mass is stirred thoroughly until by the melting and stirring the ingredients are mixed together in complete uniformity. When the materials have been thus brought to one thoroughly mixed and homogeneous mass, the mixture is allowed to cool and harden. When hardened or set, it will of course assume the brittleness that would naturally result in a combination of two such substances as those in question. It is then removed from the crucible and ground to a powder of the size of that usually found desirable for compounds of this nature. When a little of the resultant product is sprinkled on the already-heated parts to be welded together before making the joint, it will be found that it not only imparts considerably to the strength, increasing the latter materially over what it would otherwise be, but tends to temper the metal. In fact, I have found it by actual practice to be a very valuable auxiliary in tempering tools.

I claim—

The method of manufacturing a welding compound which consists in intimately associating, so as to form a homogeneous mass, molten glass and molten borax, cooling the resultant mass until it sets and hardens, and then reducing the hardened mass to the pulverulent state, substantially as described.

In testimony that I claim the foregoing I have hereunto set my hand this 12th day of July, 1902.

PITER VERVAET.

Witnesses:
JOHN W. STEWARD,
JOHN LAMBORN.